United States Patent [19]

Lisle et al.

[11] Patent Number: 5,418,536
[45] Date of Patent: May 23, 1995

[54] BANDWIDTH AND AMPLITUDE INSENSITIVE FREQUENCY DISCRIMINATOR

[75] Inventors: Hampton H. Lisle, Crownsville; Edgar L. Fogle, Severna Park, both of Md.

[73] Assignee: Westinghouse Electric Corporation, Pittsburgh, Pa.

[21] Appl. No.: 332,699

[22] Filed: Dec. 21, 1981

[51] Int. Cl.[6] .............................................. G01S 7/292
[52] U.S. Cl. .................................... 342/194; 342/159; 342/174; 327/44; 327/47
[58] Field of Search ............ 343/5 NQ, 7 A; 328/133, 328/138, 140, 155; 329/110; 307/514, 519, 520, 521, 522; 342/194, 195, 189, 159, 173, 174

[56] References Cited

U.S. PATENT DOCUMENTS

| | | | |
|---|---|---|---|
| 3,576,564 | 4/1971 | Galvin | 342/89 |
| 3,631,490 | 12/1971 | Palmieri | 342/160 |
| 3,962,704 | 6/1976 | Evans | 342/162 |
| 4,024,541 | 5/1977 | Albanese et al. | 342/189 |
| 4,028,697 | 6/1977 | Albanese et al. | 342/159 |
| 4,035,799 | 7/1977 | Hsiao | 342/162 |
| 4,040,057 | 8/1977 | Cross et al. | 342/159 |
| 4,225,864 | 9/1980 | Lillington | 342/194 |
| 4,242,682 | 12/1980 | Musha et al. | 342/93 |
| 4,381,508 | 4/1983 | Dunboraw, III | 342/379 |
| 4,430,654 | 2/1984 | Kupfer | 342/159 |
| 4,633,194 | 12/1986 | Kikuchi et al. | 331/25 |
| 4,634,194 | 1/1987 | Romeo, Jr. | 328/167 |

Primary Examiner—John B. Sotomayor

[57] ABSTRACT

A frequency discriminator which generates an output signal characteristically representative of a predetermined frequency spectrum of an input signal, but insensitive to variations in the amplitude and spectral width thereof is disclosed. The frequency discriminator is adaptable for use in a radar receiver clutter tracking loop to improve the filtering of clutter signals from the radar returns by maintaining a measured centroid frequency of the clutter signal spectrum substantially at a desired frequency with a loop response which is invariant to both amplitude and spectral width of the clutter signals. More specifically, the frequency discriminator when included in a clutter tracking loop of a radar receiver discriminates from the clutter spectrum a plurality of frequency signals in accordance with a preselected sequence and computes the amplitudes thereof to generate a corresponding sequence of amplitude signals. The sequence of amplitude signals are non-uniformly weighted in accordance with their position in the sequence and added together to form a first composite signal. In addition, the sequence of amplitude signals are also uniformly weighted, preferably by a weighting factor of unity, and added together to form a second composite signal. The first composite signal is divided by the second composite signal in the frequency discriminator to generate an output error signal which is utilized by the clutter tracking loop to render the frequency centroid of the clutter signal spectrum substantially at the tuned frequency of a clutter signal filter.

14 Claims, 8 Drawing Sheets

CLUTTER SPECTRUM CENTER FREQUENCY ERROR

FIG. 12

BANDWIDTH AND AMPLITUDE INSENSITIVE FREQUENCY DISCRIMINATOR

GOVERNMENT CONTRACT CLAUSE

The Government has rights in this invention pursuant to Contract No. F-09603-79-G-1112 awarded by the Department of the Air Force.

BACKGROUND OF THE INVENTION

The present invention relates to frequency discriminators, in general, and more particularly to a frequency discriminator for generating an output signal characteristically representative of a predetermined frequency spectrum of an input signal, but insensitive to variations in the amplitude and spectral width thereof, said frequency discriminator adaptable for use in a radar receiver clutter tracking loop to improve the filtering of clutter signals from the radar returns by maintaining a measured characteristic frequency of the clutter signal frequency spectrum substantially at a desired frequency with a loop response which is invariant to both amplitude and spectral width of the clutter signals.

Most modern airborne radars have the capability of detecting moving targets by distinguishing the moving target return signals from the clutter signals. Generally, this is accomplished by first suppressing or rejecting the clutter signals from the radar beam returns utilizing a clutter reject filter.

Figure 1:
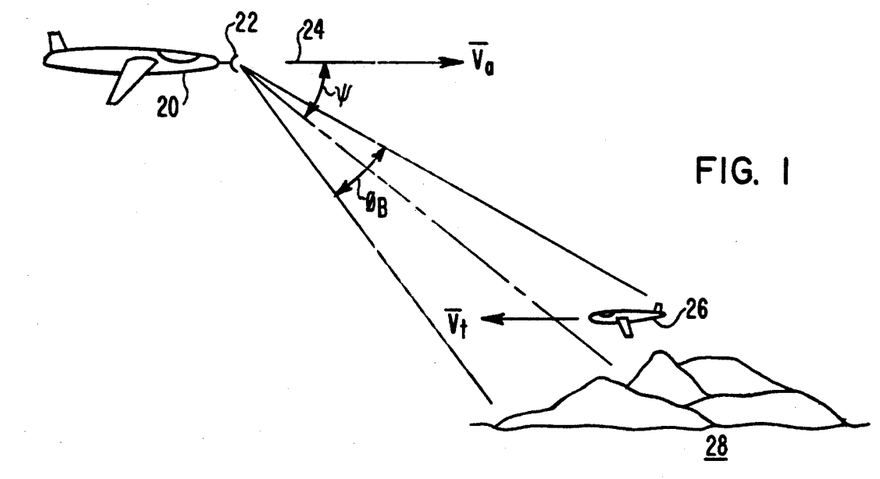
FIG. 1 is an illustration of a typical scenario of an aircraft with an on-board radar set suitable for embodying the principles of the present invention.

Problems associated with rejecting clutter return signals are particularly acute in airborne radars which scan their radar beam downward from a radar antenna mounted on a rotatable airborne antenna platform. Under these conditions, the radar beam transmitted signals not only echo from the moving target within the radar beam but also from any ground terrain background. A typical scenario is illustrated in FIG. 1. An airborne radar may be mounted on board an aircraft 20 having a radar antenna 22 which is capable of controlling an antenna beam $\phi_B$ thereof downward through a scanning or pointing angle $\psi$ referenced to a predetermined elevation level 24. The moving target for this example may be another aircraft like that shown at 26, for example, having a background of ground terrain 28. In the scenario illustrated, the aircraft 20 may be moving with a velocity $v_a$ and the aircraft 26 may be moving at a velocity $v_t$.

Figure 2:
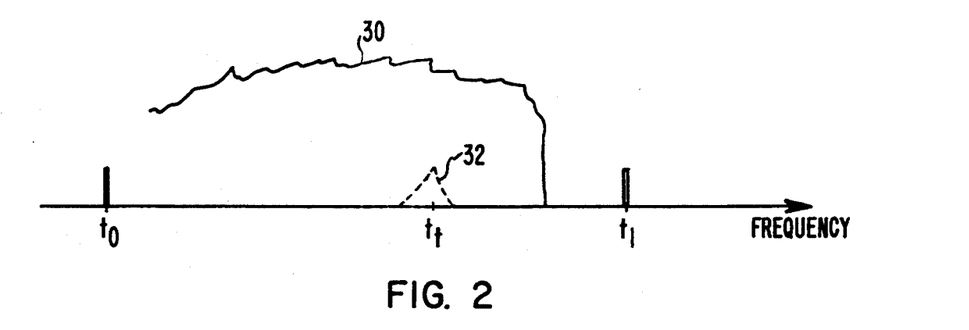
FIG. 2 is a graph illustrating radar return signal power levels during an interpulse period of a pulse doppler airborne radar.

For a pulse doppler airborne radar, the radar return signals during an interpulse period may appear as that shown by the graph of FIG. 2. In FIG. 2, the interpulse period falls between the pulsed transmissions at the times denoted as $t_0$ and $t_1$. The clutter return signal power denoted by the solid line 30, is generally much greater in magnitude than that of the return signal echoing from the target of interest which is denoted by the dashed line 32 occurring at approximately $t_t$. As a result of the large differences in return signal magnitudes, it is generally very difficult to distinguish a target return signal from the clutter return signal without further processing.

Figure 3:
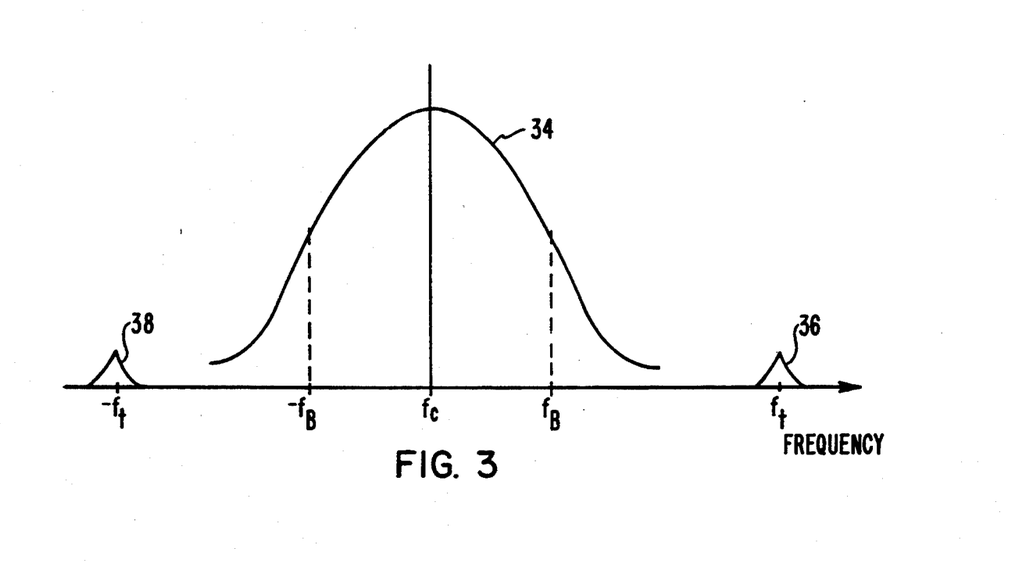
FIG. 3 is a graph illustrating a doppler frequency spectrum developed from many successive interpulse periods in accordance with the return signal contents of one or more range cells thereof.

For this reason, most doppler radars generally combine many successive interpulse periods to develop a frequency spectrum for each of a predetermined number of time increments or range cells of the interpulse periods in accordance with the return signal contents thereof. A graph depicting a developed doppler frequency spectrum for a range cell or group of range cells is exemplified in FIG. 3. Usually, the clutter return signal power, denoted by the solid line 34, is centered about a doppler centroid frequency $f_C$. In this example, the clutter signal frequency spectrum 34 may be considered as having a bandwidth between the frequencies $-f_B$ and $f_B$ with respect to the doppler centroid frequency $f_C$. On the other hand, the doppler frequency spectrums of typical moving targets may appear as that shown at 36 or 38 having doppler centroid frequencies of $f_t$ and $-f_t$, respectively. As long as the doppler centroid frequency $f_C$ remains substantially fixed in the doppler frequency spectrum, a clutter reject filter may be tuned to the doppler centroid $f_C$ to filter out the clutter signals substantially within the bandwidth $-f_B$ to $f_B$ or thereabout. Accordingly, once the clutter signals are rejected from the frequency spectrum of the return signals, only the moving target signals remain for detection.

In most cases, however, the doppler frequency spectrum of the clutter returns is somewhat unstable particularly in the application of airborne radars where the doppler frequency spectrum of the clutter return varies with the aircraft motion in combination with the scanning of the radar antenna causing the doppler centroid frequency of the clutter signals to deviate from the tuned frequency $f_0$ of the reject filter. To compensate for the variations of the centroid frequency of the clutter signals, some airborne radars have included a clutter tracking loop to maintain the doppler centroid frequency of the clutter signal frequency spectrum substantially at the tuned frequency of the clutter reject filter. A block diagram schematic of such a clutter tracking loop embodied within a typical radar is shown in FIG. 4.

Figure 4:
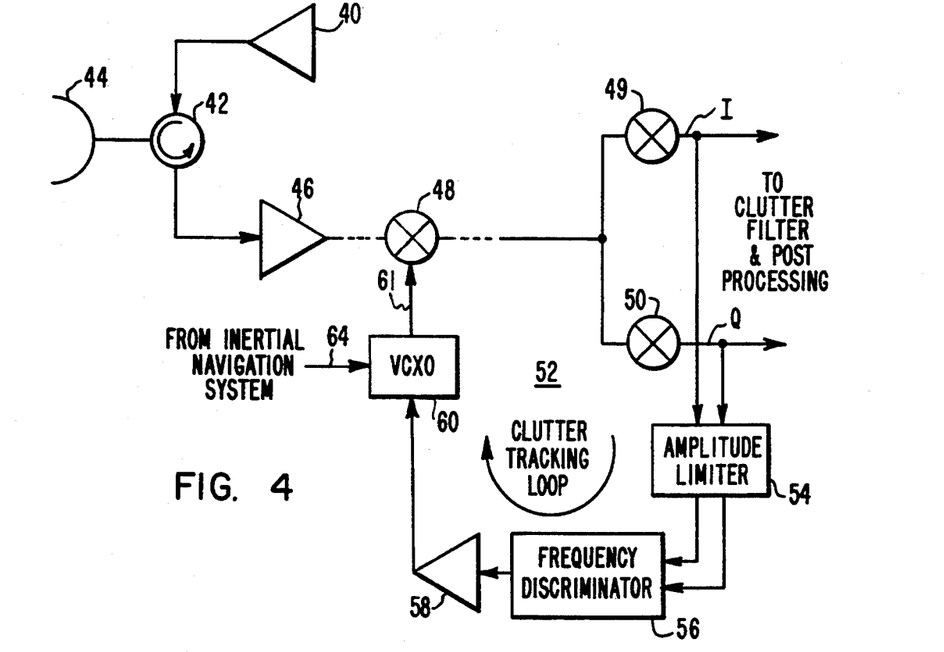
FIG. 4 is a block diagram schematic of a typical radar receiver including a clutter tracking loop suitable for embodying the principles of the present invention.

Referring to FIG. 4, in a typical radar receiver, a transmitter 40 may generate transmitting signals which are conducted through a conventional circulator 42 and beamed over a spatial region via a rotatable antenna denoted at 44. Echo signals received from clutter and moving targets in the beamwidth of the radar are collected by the antenna 44 and conducted to an RF amplifier 46 via the circulator 42. Downstream of the RF amplifier 46 may be a plurality of mixers, a typical one or more of which being denoted at 48. The plurality of mixers are operative to convert the clutter and target return signal information from the RF portion of the spectrum through the IF down to the video or baseband portion of the frequency spectrum. Another set of mixers 49 and 50 may be included in the plurality to separate the clutter and target return signal information into in-phase (I) and quadrature (Q) components which may be thereafter conducted to a clutter reject filter and post processing apparatus (not shown).

The clutter tracking loop 52 generally includes an amplitude limiter 54, a frequency discriminator 56, an amplifier filter 58 and a voltage controlled crystal oscillator 60. Present clutter tracking loops generally use an analog split-filter discriminator or digitial signal frequency discriminator of the Foster-Seely type, for example, for implementing the function of the block 56. This type of frequency discriminator 56 is preceded by a hard amplitude limiter 54 so as to make the frequency discrimination operation carried out therein insensitive to the amplitudes of the received signal components I and Q. Both of the aforementioned discriminator types exhibit a characteristic steady-state transfer function which approaches the traditional "S" curve, such as that shown by the solid line 62 in the graph of FIG. 5.

Figure 5:
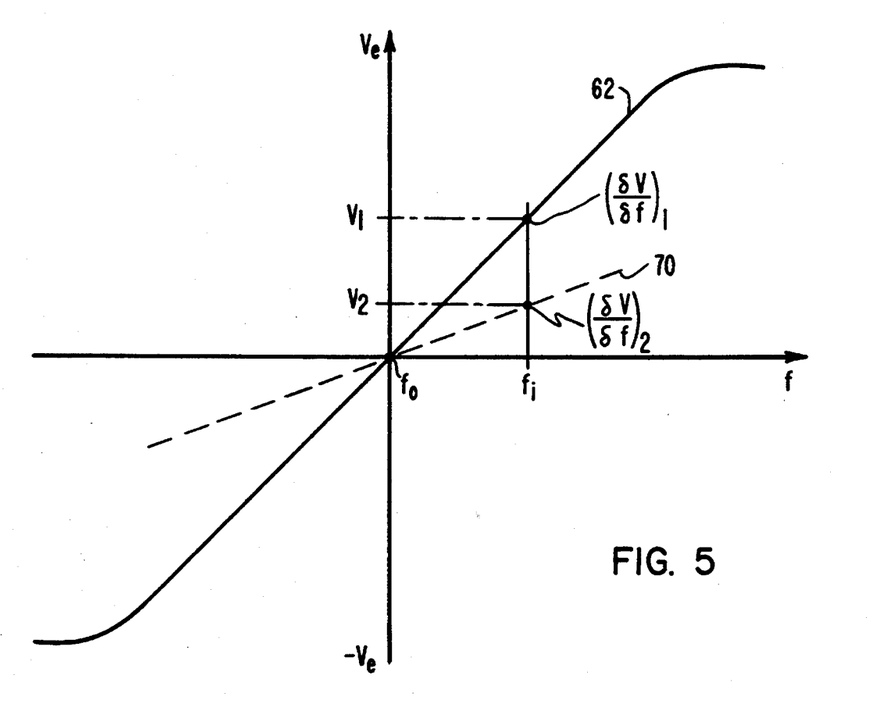
FIG. 5 is a graph depicting typical steady-state transfer functions characterizing a frequency discriminator for use in the embodiment depicted in FIG. 4.

The gain ($\delta V/\delta f$), of the discriminator 56 (i.e. the slope of line 62) remains stable for the ideal case in which the clutter signal frequency spectrum is of a very narrow bandwidth.

In general, the predetermined or initial centroid frequency $f_C$ estimate for the clutter tracking loop 52 may be calculated from the aircraft navigation signals. This estimate denoted by the signal line 64, is input to the clutter tracking loop 52 via oscillator 60 for initializing the loop 52 during the acquisition operations thereof. The initial or acquisition frequency signal 64, in turn, governs the oscillator 60 to provide a frequency signal 61 to a selected one or more of the mixers 48 of the plurality to render the centroid frequency of the clutter spectrum at a predetermined baseband frequency which is generally zero frequency. In most modern air-craft, the navigation data is so accurate that the error between the actual and predicted centroid of the instantaneous clutter frequency spectrum is less than the PRF or sampling rate of the radar. This net error, however, is still too large to enable accurate target detection. Nonetheless, it is still possible to narrow the frequency discriminator bandwidth of the loop 52 such that return signals of interest like the moving target returns, for example, outside of the frequency range of the clutter frequency spectrum (see FIG. 3) are less likely to affect the loop 52 by pulling it off frequency lock.

However, a frequency discriminator with a frequency bandwidth only slightly wider than the maximum spectral width of the clutter signal frequency spectrum is characteristically subject to large changes in gain or slope as the spectral width of the clutter signal changes. For example, referring to the graph of FIG. 5, suppose that the initial or acquisition frequency $f_o$ of the loop 52 is set by the inertial navigation system via line In the ideal case, where the frequency spectrum of the clutter signal returns is very narrow, the frequency discriminator 56 may derive a frequency centroid $f_i$ thereof from the amplitude limited I and Q return signal components via unit 54 and in turn, generate an error voltage $V_1$ (see curve 62 in FIG. 5) in response to a center frequency deviation (i.e., between the tuned frequency $f_o$ and centroid $f_i$). The error signal $V_1$ may be filtered and conditioned in the amplifier-filtering circuit 58 and passed along to the voltage control crystal oscillator 60 for governing the output frequency signal 61 thereof. Subsequently, the error signal $V_1$ generated by the discriminator 56 is gradually caused to converge to zero as the instantaneous frequency centroid $f_i$ of the clutter frequency spectrum is controlled by the loop 52 to the tuned frequency $f_0$ of the clutter reject filter (not shown). Under these ideal conditions, the response of the clutter tracking loop 52 is relatively stable and dependent on the gain $(\delta V/\delta f)_1$ or slope of the curve 62.

Figure 6A:
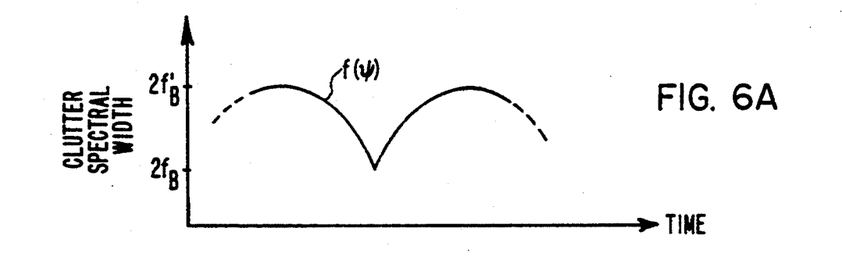
FIGS. 6A and 6B are graphs illustrating the variation in clutter spectral width with antenna pointing angle $\psi$.
Figure 6B:
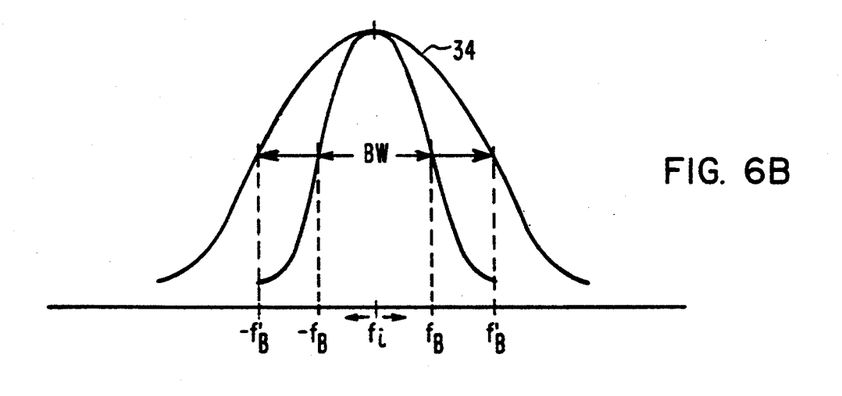

However, this is generally not the case in practice because the bandwidth of the clutter signal frequency spectrum is not ideally narrow and stable, nor is the frequency centroid thereof substantially fixed. For example, in the case of an airborne radar with a rotating antenna, the clutter signal spectral width is a function of the pointing angle $\psi$ of the scanning antenna and the aircraft velocity. Therefore, as the radar antenna is rotated through its scanning angle, the clutter signal bandwidth will vary responsively as a function of the scanned pointing angle $\psi$. An example of this variation in clutter signal bandwidth for a forward sector scan of the radar antenna is illustrated in the graphs of FIGS. 6A and 6B. FIG. 6A exhibits the spectral width variation with respect to repetitious forward sector scans of the beam pointing angle $\psi$. And accordingly, FIG. 6B illustrates the corresponding variation in the clutter signal spectral width relative to the forward sector scan of the antenna.

In response to these bandwidth variations of the clutter signal return, the gain of the frequency discriminator 56 is caused to change. For example, as the bandwidth of the clutter signal spreads out away from the ideal narrow case, the gain of the frequency discriminator 56 decreases as exhibited by the dashed line 70 in FIG. 5. With this reduced gain $$\left(\frac{\delta v}{\delta f}\right)_2,$$

a different error signal $V_2$ may be generated by the discriminator 56 for the same instantaneous frequency centroid variation $(f_i - f_o)$. As a result, the clutter tracking loop 52 takes a longer time in converging the instantaneous frequency centroid $f_i$ to the tuned frequency $f_0$ of the clutter reject filter.

It is apparent then that as the clutter signal bandwidth varies, the response of the loop 52 will likewise vary proportionately therewith. Accordingly, this sensitivity to variation in the spectral bandwidth of the clutter signal promotes a less than stable response from the clutter tracking loop. In order to provide a fixed, stable response in the clutter tracking loop 52, a frequency discriminator having a transfer characteristic which is relatively independent of the amplitude and spectral width of the clutter return signals it is operating on is needed. It is the intent therefore in the instant application to disclose a more desirable frequency discriminator having characteristics improved over the discriminators presently used especially in the application to clutter tracking loops for stabilizing the loop response thereof.

SUMMARY OF THE INVENTION

In accordance with one aspect of the present invention, a frequency discriminator provides an output signal characteristically representative of a predetermined spectrum of an input signal, the discrimination process being insensitive to amplitude and spectral width of the predetermined spectrum. More specifically, the discriminator comprises a means for discriminating from a portion of the input signal within the predetermined frequency spectrum a plurality of signals, means for generating a set of amplitude signals correspondingly representative of the amplitudes of the plurality of frequency signals, first means for non-uniformly weighting the generated set of amplitude signals to generate a first set of weighted amplitude signals, second means for uniformly weighting the generated set of amplitude signals to generate a second set of weighted amplitude signals, at least one summing unit for adding together the first set of weighted amplitude signals to form a first composite signal and for adding together the second set of weighted amplitude signals to form a second composite signal, and a divider unit for dividing the first composite signal by the second composite signal to generate the output signal. Preferably, the plurality of frequency signals are discriminated from the input signal in accordance with a preselected sequence of frequencies. Accordingly, an amplitude is computed for each frequency signal of the preselected sequence to generate a corresponding sequence of amplitude signals which are in turn non-uniformly weighted in proportion to their position in the sequence. In this case, the second means may uniformly weight the set of amplitude signals with a weighting factor of unity.

In another aspect of the present invention, the frequency discriminator is adapted for use in a clutter tracking loop of a radar receiver to improve the filtering of clutter signals from the radar beam returns by maintaining a measured characteristic frequency of the clutter frequency spectrum substantially at a desired frequency with a loop response which is substantially insensitive to variations in clutter signal amplitude and spectral width.

More specifically, the radar receiver includes a plurality of mixers for converting the radar beam returns from RF to video frequency and for separating the video frequency signals into in-phase (I) and quadrature (Q) components. In this aspect, the discriminating means of the frequency discriminator discriminates from the I and Q components of the clutter signal frequency spectrum, a plurality of I frequency signals and a respectively corresponding plurality of Q frequency signals. The deriving means derives an amplitude from each respectively corresponding pair of I and Q frequency signals of the pluralities to generate a corresponding plurality of amplitude signals. The first means, second means, at least one summing unit, and divider unit perform their corresponding functions much as described hereabove to generate an error signal which governs a means for generating a control frequency signal, whereby the control frequency signal may be coupled to at least one of the mixers of the plurality of receiver mixers to converge the characteristic frequency of the clutter frequency spectrum to the desired frequency.

In one case, the discriminating means includes two filter banks with their inputs being respectively coupled to the I and Q signal components. Each filter bank includes a set of passband filters tuned to a preselected frequency sequence with each filter operative to pass one of the filter signals of the plurality. The filter banks render a plurality of I frequency signals and a plurality of Q frequency signals mutually respectively corresponding to the preselected frequency sequence. In another case, the discriminating means includes a signal processor programmed to transform the I and Q signal components of the radar beam return signals into a plurality of I frequency signals and a plurality of Q frequency signals mutually respectively corresponding to a preselected sequence of frequencies in accordance with a Fast Fourier Transform (FFT) algorithm. In either case, the deriving means includes at least one amplitude detector for computing an amplitude for each pair of respectively corresponding I and Q frequency signals of the preselected sequence to generate a corresponding sequence of amplitude signals which are non-uniformly weighted in the first means in proportion to their position in the sequence.

In one embodiment the plurality of mixers of the radar receiver may convert the radar beam returns including the clutter signal frequency spectrum from RF to a base band frequency level, in which case, the clutter tracking loop includes means for maintaining the frequency centroid of the clutter signal frequency spectrum substantially at the desired base band frequency.

DESCRIPTION OF THE PREFERRED EMBODIMENT

Figure 7:
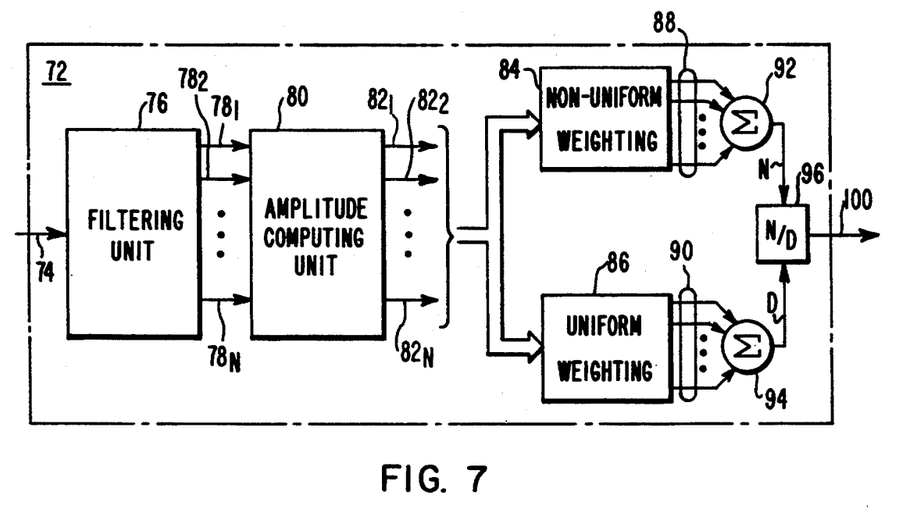
FIG. 7 is a block diagram schematic of a frequency discriminator suitable for use in the clutter tracking loop embodiment depicted in FIG. 4.

A frequency discrimator 72 for providing an output signal characteristically representative of a predetermined frequency spectrum of an input signal may be embodied as that shown by the block diagram schematic of FIG. 7. An input signal 74 may be coupled to a filtering unit 76 which is operative to discriminate from a portion of the input signal 74 within a predetermined frequency spectrum thereof a plurality of frequency signals denoted as $78_1, 78_2, \ldots 78_n$. The filtering unit 76 may be comprised of a set of filters which may be tuned correspondingly to a preselected sequence of frequencies. Alternatively, the filtering unit 76 may be a signal processor programmed to perform a similar filtering function as that of the sequence of filters. In either case, the plurality of frequency signals $78_1, 78_2, \ldots 78_n$ are discriminated in accordance with the preselected sequence of tuned frequencies and thereafter, may be input to an amplitude computing unit 80 which may include at least one amplitude detector for computing the amplitude of each frequency signal of the plurality in order to generate a set of amplitude signals $82_1$, $82_2$, ..., $82_n$ correspondingly relating to the frequency signals $78_1$, $78_2$, ..., $78_n$.

In a parallel arrangement, the generated amplitude signals may be coupled to both a non-uniform weighting unit 84 and a uniform weighting unit 86. The non-uniform weighting unit 84 may be operative to non-uniformly weight each of the generated amplitude signals coupled thereto to generate a first set 88 of weighted amplitude signals respectively associated therewith. Similarly, the uniform weighting unit 86 may be operative to uniformly weight the generated amplitude signals to generate a second set 90 of weighted amplitude signals. Summing units 92 and 94 may be operative to add together the first set 88 of weighted amplitude signals to form a first composite signal N and add together the second set 90 of weighted amplitude signals to form a second composite signal D, respectively. A divider unit 96 may be operative to generate an output signal 100 of the frequency discriminator 72 by dividing the composite signal N by the composite signal D.

In one embodiment, the non-uniform weighting unit 84 may be operative to weight each of the amplitude signals of the generated sequence $82_1$, $82_2$, ..., $82_n$ in proportion to their position in the frequency sequence. In the same embodiment, the uniform weighting unit 86 may uniformly weight the set of amplitude signals with a weighting factor of unity. In the embodiment shown in FIG. 7, the formation of the composite signal N by the non-uniform weighting unit 84 and summer 92 renders the output signal 100 substantially insensitive to variations in the spectral spread of the finite frequency spectrum of the input signal being characteristically measured. In addition, dividing the formed composite signal N by the formed composite signal D in unit 96 is a normalizing operation wherein the normalizing factor D renders the output signal N/D substantially insensitive to instantaneous amplitude changes in the finite frequency spectrum of the input signal 74. In the above-described manner, the frequency discriminator embodiment 72 generates an output signal 100 characteristically representative of the predetermined frequency spectrum of the input signal 74 invariantly to the amplitude and spectral width thereof.

In another aspect of the present invention, the frequency discriminator 72 may be embodied in a radar receiver clutter tracking loop similar to the one described in connection with the embodiment of FIG. 4. Clutter tracking loops of this type, which have been described in the Background section hereabove, are included in radar receivers to improve the filtering of clutter signals from the radar beam returns by maintaining a measured characteristic frequency of the clutter signal frequency spectrum, like the frequency centroid, for example, substantially at a desired frequency which is generally the tuned frequency of the reject clutter filter. Inclusion of the frequency discriminator 72 in the clutter tracking loop 52 as shown by the schematic block diagram embodiment of FIG. 8 renders a loop response which is substantially insensitive to variations in both clutter signal amplitude and spectral width.

Figure 8:
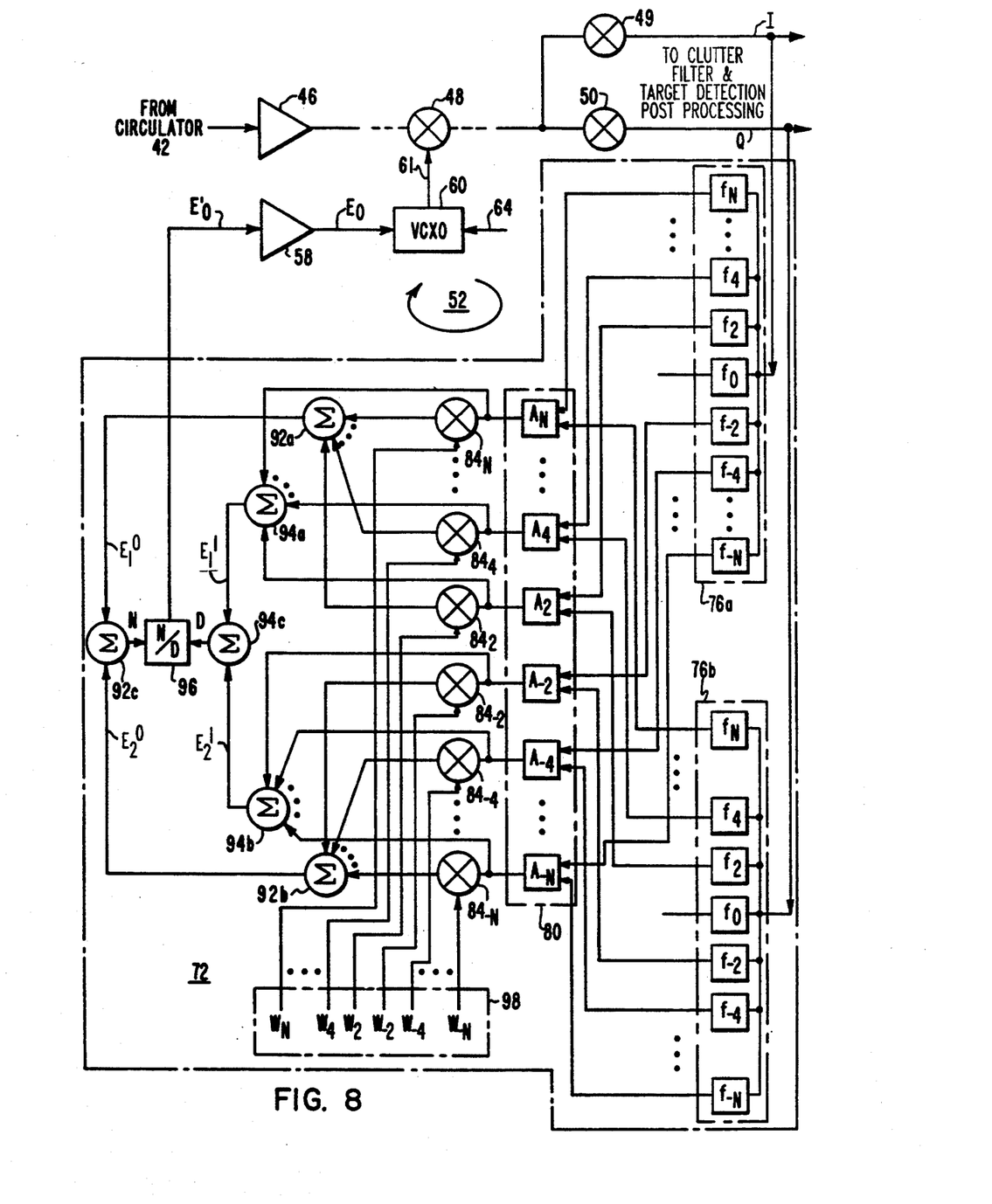
FIG. 8 is a block diagram schematic depicting one embodiment of the frequency discriminator exhibited in FIG. 7 and its inclusion in a clutter tracking loop of a radar receiver.

In the embodiment of FIG. 8, the inphase (I) and quadrature (Q) components of the radar beam returns may be coupled to the filter banks 76a and 76b, respectively. Each filter bank 76a and 76b may include a plurality of passband filters for discriminating a plurality of I frequency signals and a respectively corresponding plurality of Q frequency signals from the I and Q components of the clutter signal frequency spectrum of the radar beam returns. In the preferred embodiment, each passband filter may be tuned to a center frequency which is one of a preselected sequence of frequencies which may include frequency sequences on both sides of a center frequency $f_0$, like for example the sequence $f_N$..., $f_4$, $f_2$, $f_{-2}$, $f_{-4}$, ... $f_{-N}$. Accordingly, with thirteen passband filters included on each side of the center frequency $f_0$, a total of twenty-six corresponding frequency signals may be rendered from each of the I and Q filter banks 76a and 76b, respectively.

A set of amplitude detectors 80 may be utilized for deriving an amplitude from each respectively corresponding pair of I and Q frequency signals of the pluralities to generate a corresponding plurality of amplitude signals which may be coupled correspondingly to the inputs of a set of frequency signal multipliers $84_N$..., $84_4$, $84_2$, $84_{-2}$, $84_{-4}$, ..., $84_{-N}$. A predetermined set of non-uniform weighting signals $W_n$, ..., $W_4$, $W_2$, $W_{-2}$, $W_{-4}$, ... $W_n$ may be stored in a memory unit 98 and therefrom coupled to a respectively corresponding frequency signal multiplier. Accordingly, the non-uniform weighting operations performed by the frequency signal multipliers in turn generate the first set of weighted amplitude signals 88. The combination of summing units 92a, 92b and 92c are operative to add together the first set of weighted amplitude signals to yield the composite signal N. In this embodiment, the weighted signals of the first set related to the frequency sequence on one side of the center frequency $f_0$ are summed in the unit 92a and likewise, the weighted amplitude signals of the first set relating to the sequence of frequencies on the other side of the center frequency $f_0$ are added together in the summer 92b. The resulting sums of 92a and 92b, $E_1^0$ and $E_2^0$, respectively, are summed in the unit 92c to form the composite signal N.

The uniform weighting operation 86 is accomplished in the present embodiment by passing the set of amplitude signals unweighted or with a weighting factor of unity to their respective summing units 94a, 94b and 94c, which in combination form the composite signal D. More specifically, the amplitude signals related to the sequence of frequencies on one side of the center frequency $f_o$ are summed in the unit 94a and similarly, the amplitude signals of the set related to the sequence of frequencies on the other side of the center frequency $f_0$ are summed in the unit 94b. Accordingly, the resulting sums $E_1^1$ and $E_2^1$ rendered by the units 94a and 94b, respectively, are added together in the summer 94c to form the composite signal D. An unfiltered error signal $E'_0$ generated by the divider unit 96 may be filtered and conditioned by the amplifier circuit 58 to yield the error signal $E_0$ which governs the voltage controlled crystal oscillator 60.

Figure 9A:
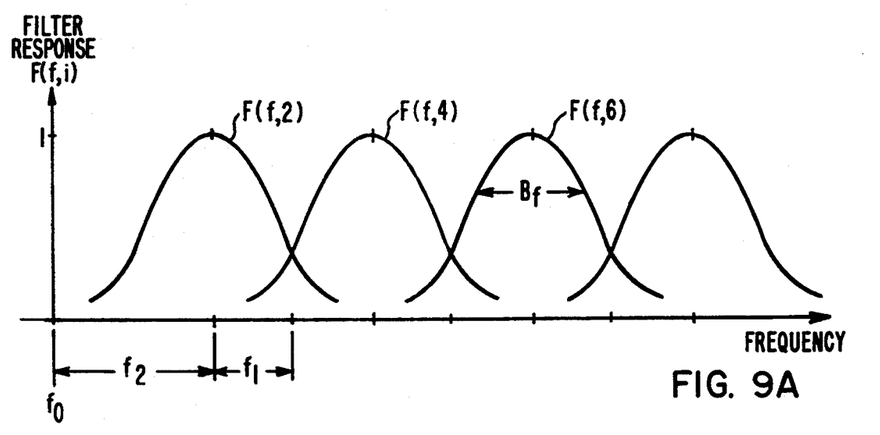
FIG. 9A is a graph illustrating the filter response curves of the passband filters of the filter banks included in the embodiment of FIG. 8.

An illustration of a typical filter bank response is depicted in the graph of FIG. 9A. Each curve in the graph of FIG. 9A is representative of the response of a corresponding passband filter in the filter bank 76a or 76b. It is understood that while the graph depicts only responses of passband filters for the sequence of frequencies on one side of the center frequency $f_O$, it may be equally applied to the other side because the sequence of tuned frequencies on the other side of the center frequency $f_0$ may be preset as the mirror image of those on the one side about the ordinate of the filter response curve. The filter response then for any passband filter i may be represented by the formula F (f,i) where f represents the centroid frequency of the clutter signal spectrum. In the illustration of FIG. 9A, the sequence of tuned frequencies are preselected in accordance with the even harmonics of a fundamental frequency $f_1$. Therefore, the tuned frequency of the first filter with respect to a center frequency $f_0$ is $2f_1$ or $f_2$, and for the second filter $4f_1$ or $f_4$, and so on. In the present example, each of the passband filters may have a bandwidth designated as $B_f$.

A composite non-uniformly weighted response, denoted as $F(f)_w$, from all of the passband filters of the filter bank on one side of the center frequency $f_0$ may be derived in accordance with the mathematical expression (1) found herebelow. Equation (1) represents a filter bank response to a very narrow bandwidth signal having a frequency centroid f deviating from the predetermined tuned frequency $f_0$.

$$F(f)_w = \sum_{i=2,4,6\ldots}^{N} W(i)\, F(f,i), \qquad (1)$$

where W(i) equals i/2, and the expression F(f,i) may be expressed by the mathematical expression:

$$F(f,i) = \exp[-a(f - if_1)^2], \qquad (2)$$

where $$a = -4\, \ln(0.707)/B_f^2. \qquad (3)$$

Of course, the unweighted response may be similarly expressed as:

$$F(f)_u = \sum_{i=2,4,6\ldots}^{N} F(f,i) \qquad (4)$$

Figure 9B:
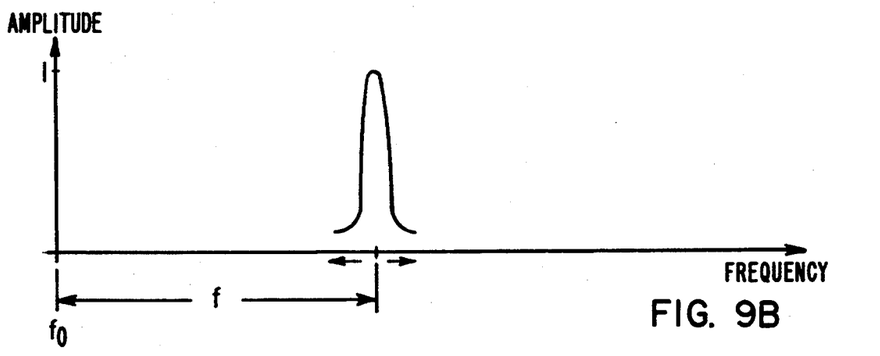
FIGS. 9B and 9C are graphs illustrating the variations in spectral width of the clutter return signals operated on by the frequency discriminator embodiment depicted in FIG. 7.
Figure 10:
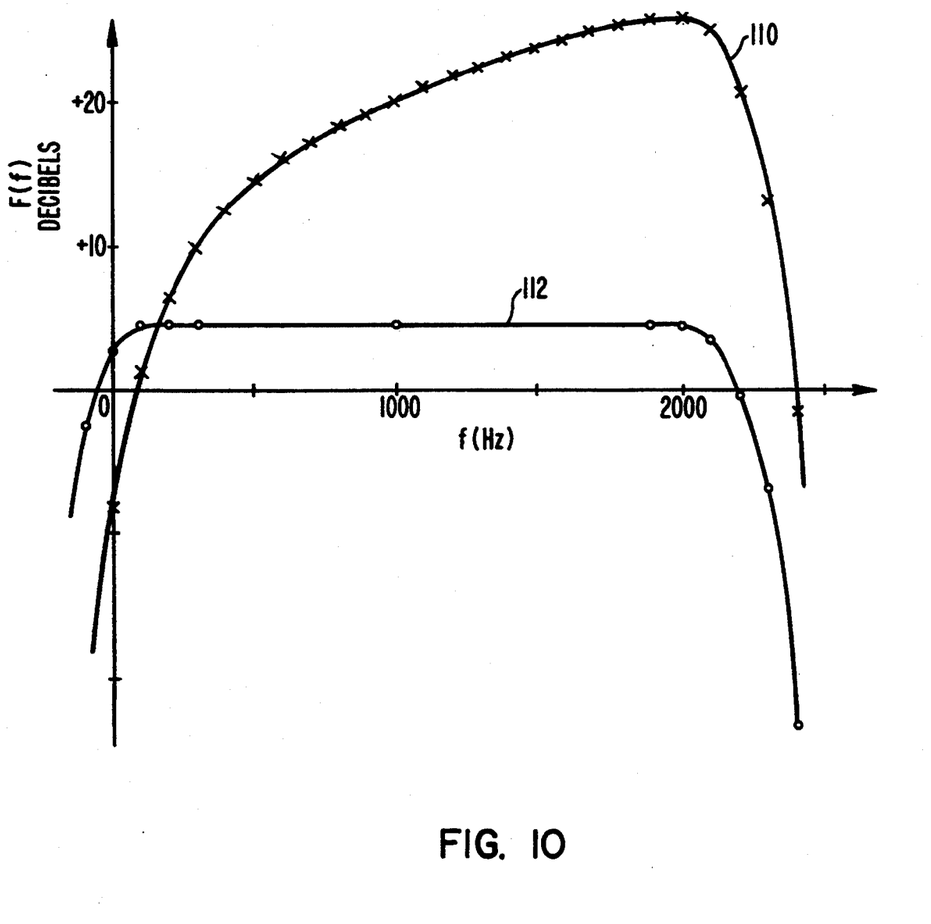
FIGS. 10 and 11 are graphs exhibiting derived experimental responses of a frequency discriminator, similar to the one depicted by the embodiment of FIG. 8, to a very narrow bandwidth clutter signal as illustrated by the graph of FIG. 9B.

Experimental results of a filter bank having the characteristics defined by the mathematical equations (1)–(4) found hereabove are exhibited in the graph of FIG. 10. For these exemplary derivations, the filter spacings $f_1$ were selected on the order of 82 Hz and the 3 dB bandwidth of the passband filters were selected on the order of 190 Hz. The derived points denoted by the X's and O's on the two curves in the graph of FIG. 10 are consistent with responses for a very narrow bandwidth clutter signal having a frequency centroid f deviating from the predetermined tuned center frequency $f_0$ (refer to the graph of FIG. 9B). In the graph of FIG. 10, the composite frequency response is measured in decibels (i.e., $20\, \log_{10} F(f)$) wherein the curve 110 reflects the derived composite signal from the first set of weighted amplitude signals $F(f)_w$ and curve 112 represents the composite signals derived from the unweighted amplitude signals $F(f)_u$. Note that in equation (1), the non-uniform weighting factors W for the derivation of the composite signal N were selected to weight the amplitude signals in proportion to the position in the frequency sequence from which they were derived (i.e. W(i)=i/2). Consequently, the amplitude signals detected from the higher number filters are more heavily weighted (higher gain). In so doing, the frequency discriminator provides an output signal N which is independent of clutter signal spectrum variation.

Figure 11:
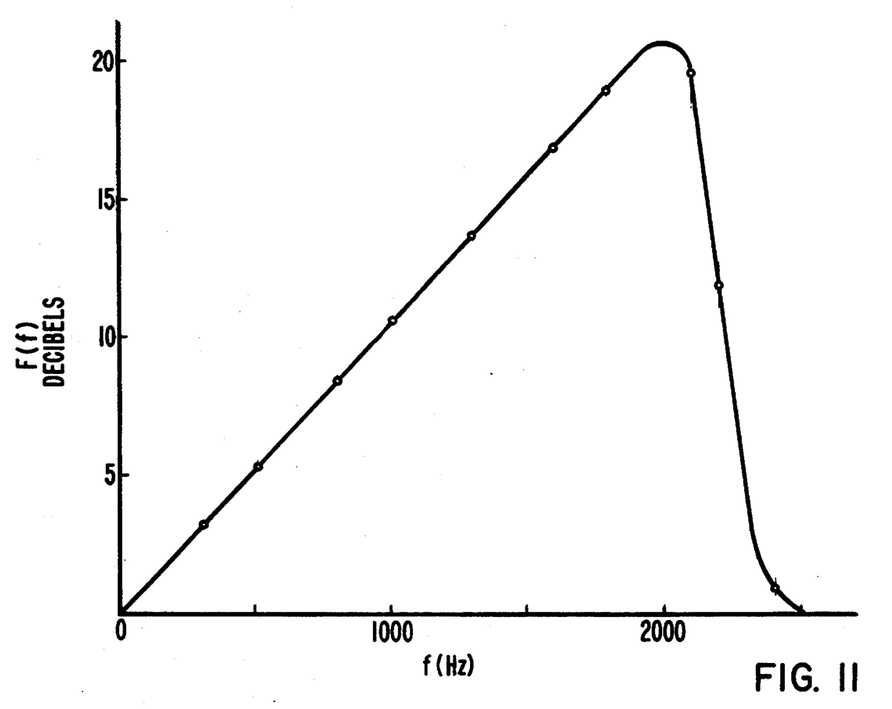

In this same example, the derived composite signals N and D are divided in accordance with the function of block 96 (refer to FIG. 8) to yield a new set of resulting derivations which are depicted in the graph of FIG. 11. Note that the resulting output signal N/D is substantially linear as a function of the centroid frequency f of the clutter frequency spectrum assuming a very narrow bandwidth thereof. While the graph of FIG. 11 exhibits results for only the positive frequency sequence (i.e. on the one side of the center frequency $f_0$, which for the present example may be zero frequency), it is understood that the overall curve is anti-symmetric about the zero frequency ($f_0$) because of the non-uniform weighting factor sequence selected for the computation of signal N.

The resulting deviations for the example described in connection with the graphs of FIGS. 10 and 11 demonstrate that the frequency discriminator embodiment as shown in FIGS. 7 and 8 provides for a substantially linear error signal output as the frequency centroid of a very narrow bandwidth input signal deviates from the desired or tuned frequency $f_0$. Of course, it is understood that in general the clutter signal frequency spectrum is not narrow band and the width thereof varies significantly as a result of many factors. Therefore, the following description is provided to demonstrate the resultant insensitivity of the frequency discriminator described in connection with the preferred embodiment to variations in the bandwidth of the clutter signal.

Figure 9C:
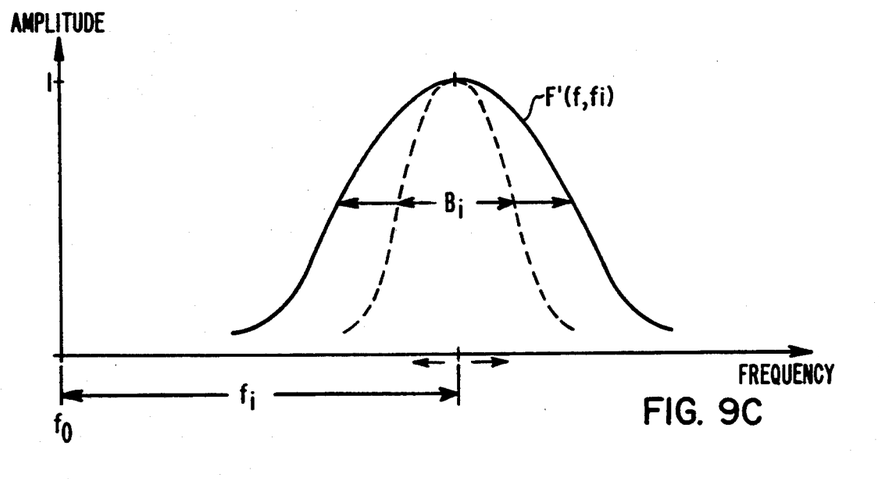

An input or clutter signal having a varying bandwidth $B_i$ and varying frequency centroid $f_i$ is illustrated by the graph of FIG. 9C. Assuming a Gaussian frequency spectrum, the input signal or clutter signal may be represented by the following mathematic equation:

$$F(f,f_i) = \frac{b}{\pi} \exp[-b(f - f_i)^2], \qquad (5)$$

where, $$b = -4\, \ln(0.5)/B_i^2. \qquad (6)$$

Referring back to the embodiment of FIG. 8, the frequency discriminator output N/D may be expressed as a function of the frequency centroid $f_i$ of the clutter signal spectrum by the following expression:

$$\frac{N}{D}(f_i) = (E_1^0 + E_2^1)/(E_1^1 + E_2^1) \qquad (7)$$

To compute the various composite signal responses $E_n^m$ of equation (7) above, the following equation may be used:

$$E_n^m (p, f_i) = \int_{-\infty}^{+\infty} F(f, f_i) \left[ \sum_{i=2p,4p,\ldots}^{N} W(i)\, F(f,i) \right] df, \qquad (8)$$

and when
  n=1, then p=1;
  n=2, then p=−1;
  m=0, then W(i)=i/2; and
  m=1, then W(i)=1.

Figure 12:
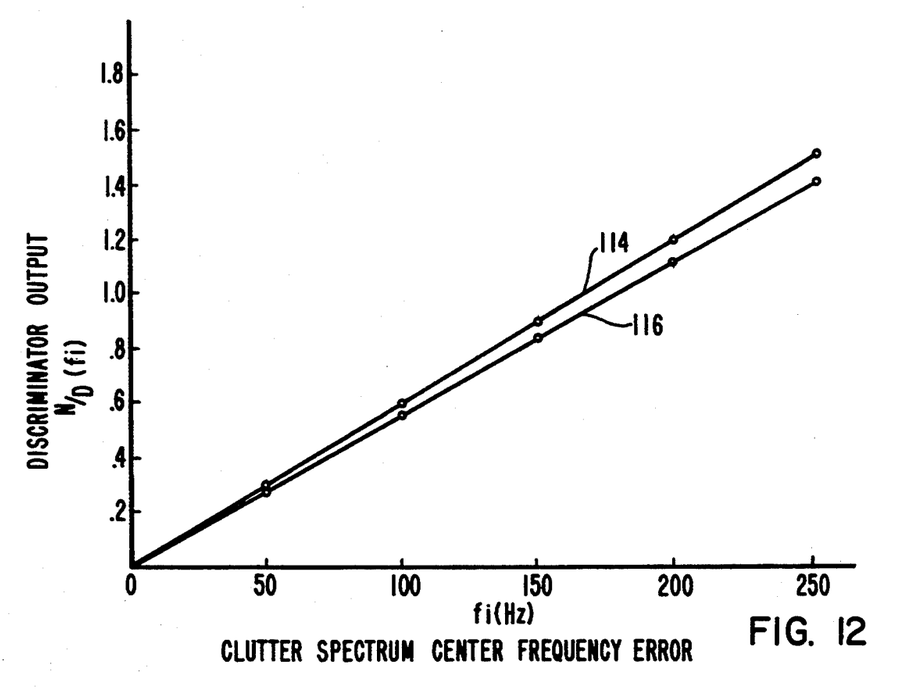
FIG. 12 is a graph exhibiting derived experimental responses of a frequency discriminator, similar to the one depicted by the embodiment of FIG. 8, to clutter signals having varying bandwidths and frequency centroids as illustrated by the graph of FIG. 9C.

Using the above equations (7) and (8), the operations of the preferred embodiment of the frequency discriminator may be simulated to yield the results as graphed in FIG. 12. In the derivation of the graph of FIG. 12, only twenty-six bandpass filters were used in each of the filter banks 76a and 76b (i.e. N=26) because (a) this provides adequate insensitivity to spectral widths of the input signal up to a maximum of 2000 Hz and (b) this prevents signals (e.g., signals from large targets or jammers) with frequencies outside the range of interest from influencing the clutter tracking loop 52. The solid line 114 in the graph of FIG. 12 represents the simulated computations of the discriminator output N/D as a function of varying frequency centroid $f_i$ for clutter signal bandwidth $B_i$ variations from 50 to 1500 Hz. In addition, the line 116 represents results from simulated computations for a bandwidth $B_i$ of 2000 Hz. It is thus demonstrated that the frequency discriminator characteristics of the preferred embodiment remain essentially constant for input or clutter signal bandwidths up to 1500 Hz and change only slightly for a signal bandwidth of 2000 Hz. The insensitivity of the frequency discriminator to input signal amplitude is provided, in this embodiment, by the normalizing computation N/D as has been described hereabove.

Figure 13:
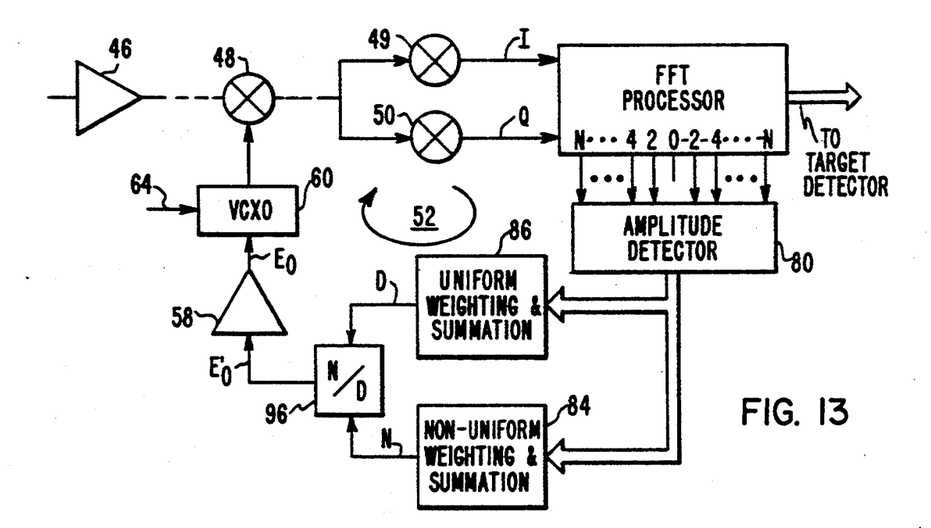
FIG. 13 is a block diagram schematic of an alternate embodiment of a radar receiver clutter tracking loop suitable for embodying the frequency discriminator depicted in FIG. 7.

Most modern radar receivers include a programmed signal processor, such as Fast Fourier Transformer (FFT) processor, for example, to discriminate preselected frequency signals from the radar beam returns or I and Q components thereof. In this case, the present invention may be embodied alternatively, as depicted in the block diagram schematic embodiment of FIG. 13. Referring to FIG. 13, the I and Q frequency signals are, in this case, generated by the FFT processor and similarly coupled to the amplitude detector 80 of the loop 52 with the other elements of the clutter tracking loop 52 remaining substantially the same as those of the embodiments described in connection with FIGS. 7 and 8. Except for the internal operations of the FFT signal processor, which are well-known, the alternate embodiment functions in a similar manner to the embodiment described in connection with FIG. 8, supra.

We claim:

1. A frequency discriminator for providing an output signal characteristically representative of a predetermined spectrum of an input signal, said discriminator comprising:
    means for discriminating from a portion of said input signal within said predetermined frequency spectrum a plurality of frequency signals;
    means for generating a set of amplitude signals correspondingly representative of the amplitudes of said plurality of frequency signals;
    first means for non-uniformly weighting said generated set of amplitude signals to generate a first set of weighted amplitude signals;
    second means for uniformly weighting said generated set of amplitude signals to generate a second set of weighted amplitude signals;
    at least one summing unit for adding together said first set of weighted amplitude signals to form a first composite signal and for adding together said second set of weighted amplitude signals to form a second composite signal; and
    a divider unit for dividing said first composite signal by said second composite signal to generate said output signal.

2. The frequency discriminator in accordance with claim 1 wherein the discriminating means comprises means for discriminating the plurality of frequency signals from the input signal in accordance with a preselected sequence of frequencies; wherein the generating means includes means for computing an amplitude for each frequency signal of said preselected sequence to generate a corresponding sequence of amplitude signals; and wherein the first means includes means for weighting each amplitude signal in proportion to its position in said sequence.

3. The frequency discriminator in accordance with claim 1 wherein the input signal comprises in-phase (I) and quadrature (Q) components; wherein the discriminating means includes two filter banks with the inputs of one filter bank being commonly coupled to said I component of the input signal and the inputs of the other filter bank being commonly coupled to the Q component of the input signal, each filter bank operative to pass the filter signals of its corresponding plurality to render a plurality of I frequency signals and respectively corresponding plurality of Q frequency signals; and wherein the generating means includes at least one amplitude detector for deriving an amplitude signal from each respectively corresponding pair of I and Q frequency signals of said plurality.

4. The frequency discriminator in accordance with claim 1 wherein the input signal comprises in-phase (I) and quadrature (Q) components; wherein the discriminating means includes a signal processor programmed to transform the I and Q components of the input signal into a plurality of I frequency signals and a plurality of Q frequency signals mutually respectively corresponding to a preselected sequence of frequencies in accordance with a Fast Fourier Transform (FFT) algorithm; wherein the generating means includes at least one amplitude detector for computing an amplitude for each pair of respectively corresponding I and Q frequency signals of said preselected sequence to generate a corresponding sequence of amplitude signals; and wherein the first means includes means for weighting each amplitude signal in proportion to its position in said sequence.

5. The frequency discriminator in accordance with claim 1 wherein the second means comprises means for uniformly weighting the set of amplitude signals with a weighting factor of unity.

6. A clutter tracking loop adapted for use in a radar receiver to improve the filtering of clutter signals from the radar beam returns by maintaining a measured characteristic frequency of the clutter frequency spectrum substantially at a desired frequency with a loop response which is substantially insensitive to variations in clutter signal amplitude and spectral width; said radar receiver including a plurality of mixers for converting the radar beam returns from RF to video frequency and for separating said video frequency signals into in-phase (I) and quadrature, (Q) components, said clutter tracking loop comprising:
    means for discriminating from said I and Q components of the clutter signal frequency spectrum a plurality of I frequency signals and a respectively corresponding plurality of Q frequency signals;
    means for deriving an amplitude from each respectively corresponding pair of I and Q frequency signals of said pluralities to generate a corresponding plurality of amplitude signals;
    first means for non-uniformly weighting said plurality of amplitude signals to generate a first set of weighted amplitude signals;
    second means for uniformly weighting said plurality of amplitude signals to generate a second set of weighted amplitude signals;
    at least one summing unit for adding together said first set of weighted amplitude signals and for adding together said second set of weighted amplitude signals to form first and second composite signals, respectively;

a divider unit for dividing said first composite signal by said second composite signal to generate an error signal; and means, governed by said error signal to generate a control frequency signal, whereby said control frequency signal may be coupled to at least one of the mixers of said plurality of receiver mixers to converge said characteristic frequency of the clutter frequency spectrum to said desired frequency.

7. The clutter tracking loop in accordance with claim 6 wherein the discriminating means comprises means for discriminating the plurality of I frequency signals and respectively corresponding plurality of Q frequency signals from the I and Q components, respectively, in accordance with a preselected sequence of frequencies; wherein the deriving means includes means for deriving an amplitude for each pair of I frequency and respectively corresponding Q frequency signals of said preselected sequence to generate a corresponding sequence of amplitude signals; and wherein the first means includes means for weighting each amplitude signal in proportion to its position in said preselected sequence.

8. The clutter tracking loop in accordance with claim 6 wherein the discriminating means includes two filter banks with the inputs of one filter bank being commonly coupled to said I signal component and the inputs of the other filter bank being commonly coupled to the Q signal component, each filter bank operative to pass the filter signals of its corresponding plurality to render a plurality of I frequency signals and respectively corresponding plurality of Q frequency signals; and wherein the deriving means includes at least one amplitude detector for deriving an amplitude signal from each respectively corresponding pair of I and Q frequency signals of said plurality.

9. The clutter tracking loop in accordance with claim 6 wherein the discriminating means includes a signal processor programmed to transform the I and Q signal components of the radar beam return signal into a plurality of I frequency signals and a plurality of Q frequency signals mutually respectively corresponding to a preselected sequence of frequencies in accordance with a Fast Fourier Transform (FFT) algorithm; wherein the deriving means includes at least one amplitude detector for computing an amplitude for each pair of respectively corresponding I and Q frequency signals of said preselected sequence to generate a corresponding sequence of amplitude signals; and wherein the first means includes means for weighting each amplitude signal in proportion to its position in said sequence.

10. The clutter tracking loop in accordance with claim 6 wherein the second means comprises means for uniformly weighting the plurality of amplitude signals with a weighting factor of unity.

11. A clutter tracking loop adapted for use in a radar receiver to improve the filtering of clutter signals from the radar beam returns by maintaining the frequency centroid of said clutter signal frequency spectrum substantially at a predetermined baseband frequency, said radar receiver including a plurality of mixers for converting the radar beam returns from RF to video frequencies referenced to said predetermined baseband frequency and for separating said video frequency signals into in-phase (I) and quadrature (Q) components, said clutter tracking loop comprising:

means for discriminating from said I and Q components of the clutter signal frequency spectrum a plurality of positive and negative I frequency signals and a respectively corresponding plurality of positive and negative Q frequency signals, said positive and negative I and Q frequency signals being referenced to said predetermined baseband frequency;

means for deriving an amplitude from each respectively corresponding pair of positive I and Q frequency signals of said pluralities to generate a corresponding plurality of first amplitude signals and for deriving an amplitude for each respectively corresponding pair of negative I and Q frequency signals to generate a corresponding plurality of second amplitude signals;

first means for non-uniformly weighting said plurality of first amplitude signals with positive weighting signals to generate a first set of weighted amplitude signals and for non-uniformly weighting said plurality of second amplitude signals with negative weighting signals to generate a second set of weighted amplitude signals;

second means for uniformly weighting said first and second plurality of amplitude signals to generate a third set of weighted amplitude signals;

at least one summing unit for adding together said first and second sets of weighted amplitude signals and for adding together said third set of weighted amplitude signals to form first and second composite signals, respectively;

a divider unit for dividing said first composite signal by said second composite signal to generate an error signal; and means, governed by said error signal, to generate a control frequency signal, whereby said control frequency signal may be coupled to at least one of the mixers of said plurality of receiver mixers to converge said frequency centroid of said clutter signal frequency spectrum to said predetermined baseband frequency.

12. The clutter tracking loop in accordance with claim 11 wherein the discriminating means includes two filter banks with the inputs of one filter bank being commonly coupled to said I signal component and the inputs of the other filter bank being commonly coupled to the Q signal component, each filter bank operative to pass the filter signals of its corresponding plurality to render a plurality of I frequency signals and respectively corresponding plurality of Q frequency signals; and wherein the deriving means includes at least one amplitude detector for deriving an amplitude signal from each respectively corresponding pair of I and Q frequency signals of said plurality.

13. The clutter tracking loop in accordance with claim 11 wherein the discriminating means includes a signal processor programmed to transform the I and Q signal components of the radar beam return signal into a plurality of I frequency signals and a plurality of Q frequency signals mutually respectively corresponding to a preselected sequence of frequencies in accordance with a Fast Fourier Transform (FFT) algorithm; wherein the deriving means includes at least one amplitude detector for computing an amplitude for each pair of respectively corresponding I and Q frequency signals of said preselected sequence to generate a corresponding sequence of amplitude signals; and wherein the first means includes means for weighting each amplitude signal in proportion to its position in said sequence.

14. The clutter tracking loop in accordance with claim 11 wherein the second means comprises means for uniformly weighting the plurality of amplitude signals with a weighting factor of unity.

* * * * *